(12) United States Patent
Fukuda

(10) Patent No.: US 6,837,225 B1
(45) Date of Patent: Jan. 4, 2005

(54) FUEL SUPPLY CONTROL DEVICE FOR A TURBO-CHARGED DIESEL AIRCRAFT ENGINE

(75) Inventor: Daiki Fukuda, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/628,439

(22) Filed: Jul. 29, 2003

(51) Int. Cl.$^7$ .............................................. F02D 23/00
(52) U.S. Cl. ..................................................... 123/552
(58) Field of Search ........................... 123/552, 559.1; 344/175; 33/328

(56) References Cited

U.S. PATENT DOCUMENTS

| | | | | |
|---|---|---|---|---|
| 5,038,742 A | * | 8/1991 | Uddin ......................... | 123/549 |
| 6,151,549 A | * | 11/2000 | Andrews et al. ............ | 701/115 |
| 6,604,515 B2 | * | 8/2003 | Marsh et al. ................ | 123/563 |
| 6,652,233 B2 | * | 11/2003 | Otake ........................... | 416/30 |
| 6,732,521 B2 | * | 5/2004 | Otake ........................... | 60/601 |

FOREIGN PATENT DOCUMENTS

| | | |
|---|---|---|
| JP | A 8-303271 | 11/1996 |
| JP | A 10-18861 | 1/1998 |
| JP | A 2001-159356 | 6/2001 |
| JP | A 2001-207897 | 8/2001 |

OTHER PUBLICATIONS

U.S. Appl. No. 10/219,494, Otake, filed Aug. 16, 2002.
U.S. Appl. No. 10/043,242, Otake, filed Jan. 14, 2002.

* cited by examiner

Primary Examiner—Marguerite McMahon
(74) Attorney, Agent, or Firm—Oliff & Berridge, PLC (57) ABSTRACT

In a fuel supply control device for a turbo-charged diesel aircraft engine, a fuel injection amount is reduced in accordance with the air temperature when the flight altitude of the aircraft is higher than a predetermined altitude. The turbocharger speed increases as the flight altitude or the air temperature becomes higher even if the engine output power is the same. Therefore, if the maximum engine output power is restricted based only on the flight altitude in order to prevent the overrun of the turbocharger, an undue restriction on the maximum output power may occur when the air temperature changes. By controlling the fuel injection amount based on both air temperature and the altitude, i.e., by reducing the fuel injection amount in accordance with the air temperature when the altitude is higher than a predetermined altitude, an undue restriction of the engine output power, as well as an over-speed of the turbocharger, can be prevented.

6 Claims, 7 Drawing Sheets

FUEL SUPPLY CONTROL DEVICE FOR A TURBO-CHARGED DIESEL AIRCRAFT ENGINE

BACKGROUND OF THE INVENTION

1. Field of the Invention

The present invention relates to a fuel supply control device for an aircraft engine and, more specifically, it relates to a fuel supply control device used for a turbo-charged diesel engine for an aircraft.

2. Description of the Related Art

Diesel engines are widely used in various fields due to their high fuel efficiencies. The use of diesel engines is not limited to surface vehicles such as automobiles. It is also known to use diesel engines in aircraft.

For example, Japanese Unexamined Patent Publication (Kokai) No. 2001-207897 discloses an example of a diesel aircraft engine. In the '897 publication, the fuel injection amount of the engine is corrected based on the exhaust temperature in order to compensate for the changes in the fuel injection characteristics of the fuel injection system due to the number of operating hours of the engine.

When a diesel engine is used in an aircraft, as the atmospheric pressure changes in accordance with the flight altitude, problems that are not found with diesel engine for surface vehicles occur. Further, although a naturally-aspirated diesel engine is used in the aircraft of the '897 publication, a so-called critical altitude problem, which is unique to a turbo-charged diesel engine, occurs if a turbo-charged diesel engine is used in an aircraft.

A critical altitude is defined as the highest flight altitude that allows the aircraft engine to operate at its rated output power.

The maximum output power that a diesel engine can produce is determined by various factors. For example, the maximum output power of diesel engine, i.e., the maximum fuel injection amount is restricted by a "smoke limit", which is the maximum amount of fuel that can be supplied to the engine without producing smoke in the engine exhaust gas.

The maximum output power is also restricted by the maximum allowable exhaust gas temperature in order to protect the engine. Further, when the engine is equipped with a turbocharger, the maximum output power of the engine is also restricted by the maximum allowable rotation speed of the turbocharger in order to prevent a "turbocharger overrun", i.e., an over-speed operation of the turbocharger.

In a high-pressure turbo-charged diesel engine, usually, turbocharger overrun is the dominant factor for restricting the maximum output power of the engine.

As the atmospheric pressure becomes lower as the flight altitude becomes higher, if the engine output power is kept at a constant value, the boost pressure must be kept at a constant value, thereby the pressure ratio at which the turbocharger operates must be increased as the altitude becomes higher. Therefore, in order to produce a rated engine output power, the turbocharger speed must be increased as the flight altitude becomes higher.

Therefore, when the engine is operated at a rated output power, the turbocharger speed reaches the maximum allowable speed when the flight altitude increases to a certain value. This flight altitude is the critical altitude. In other words, the critical altitude is the highest flight altitude that allows the engine to be operated at the rated output power without causing turbocharger overrun.

When the flight altitude exceeds the critical altitude, therefore, the fuel injection amount must be restricted in order to keep the turbocharger speed at a speed lower than the maximum allowable speed. Thus, the maximum engine output power becomes lower than the rated output power when the altitude becomes higher than the critical altitude in a turbo-charged diesel aircraft engine.

Figure 2:
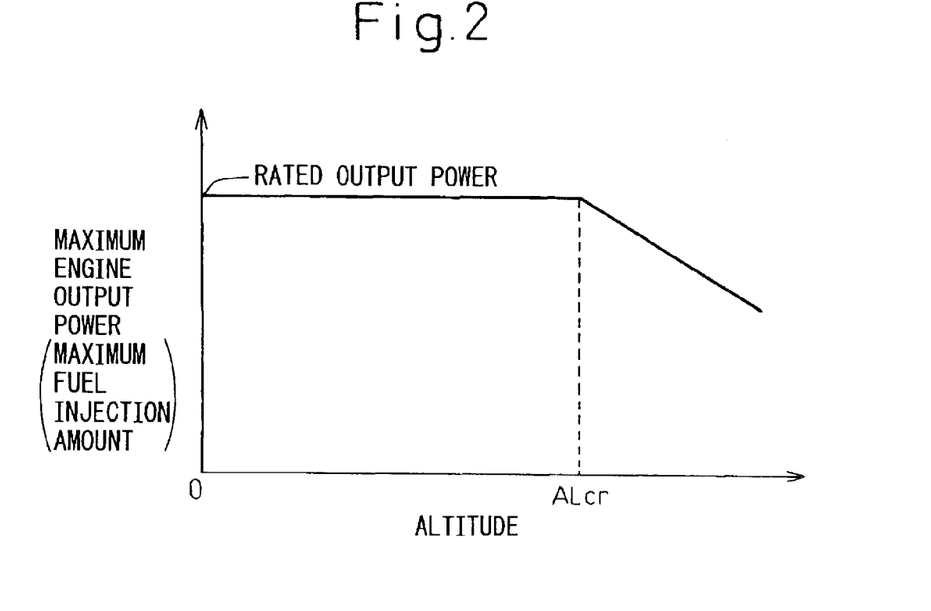
FIG. 2 is a drawing explaining a general relationship between the maximum allowable output power of the engine and the flight altitude.

FIG. 2 shows a general relationship between the maximum output power that the engine is allowed to produce and the flight altitude. As shown in FIG. 2, the maximum output power of the engine agrees with the rated output power of the engine when the flight altitude is lower than or equal to the critical altitude ALcr. However, when the flight altitude becomes higher than the critical altitude ALcr, the maximum engine output power decreases from the rated engine output power as the altitude increases. In an actual turbo-charged diesel aircraft engine, as the maximum output power of the engine corresponds to the maximum limit of the fuel injection amount, the fuel injection amount in the actual turbo-charged diesel aircraft engine is set by the line in FIG. 2 in accordance with the flight altitude.

By setting the maximum limit for the fuel injection amount of the engine by the line in FIG. 2, the engine can produce the rated output power only when the flight altitude is lower than the critical altitude.

However, in the actual operation of an aircraft, the atmospheric pressure changes depending on air temperature as well as on the altitude. Namely, when the air temperature (the ambient temperature) is higher, the density of air decreases and a higher turbocharger speed is required to achieve the same pressure ratio even if the altitude is the same. Further, as the intake air temperature of the engine also becomes higher when the air temperature is higher, the boost pressure must be increased in order to prevent a decrease in the intake air flow rate (mass flow rate) even if the engine output power is the same. Therefore, an increase in the air temperature considerably increases the turbocharger speed. Consequently, the critical altitude becomes lower when the air temperature becomes higher, in the actual operation of an aircraft.

Figure 3:
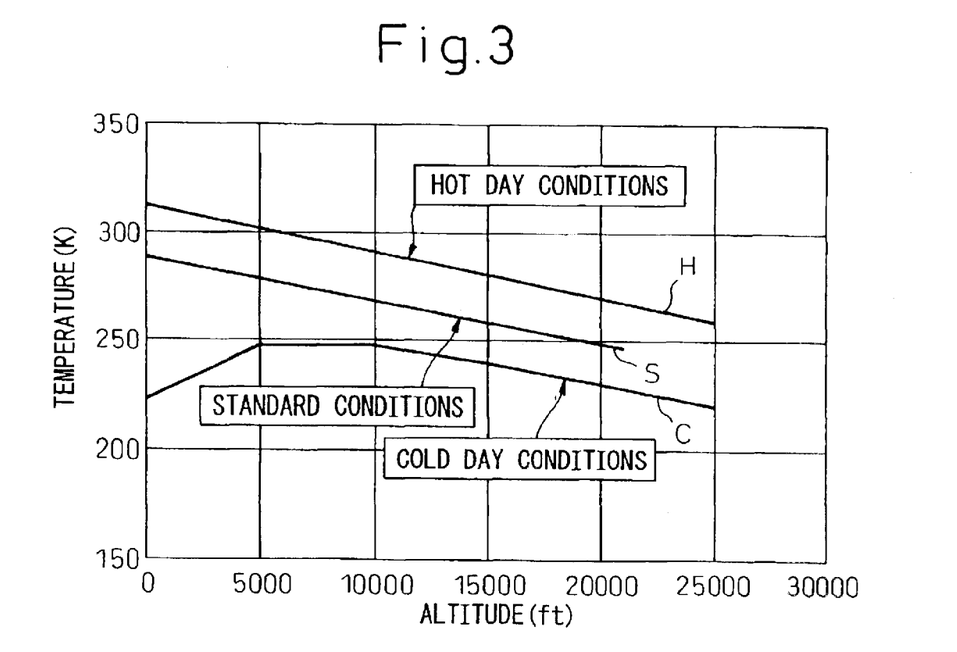
FIG. 3 is a drawing explaining the change in the air temperature in accordance with the altitude.

FIG. 3 shows the change in the air temperature in accordance with the altitude.

The line H in FIG. 3 shows the highest air temperature used for the aircraft design (a so-called "hot day conditions" temperature) and the line C shows the lowest temperature used for the aircraft design (a "cold day conditions" temperature). The line S indicates a "standard conditions" temperature that is an average actual air temperature at the respective altitudes.

Since the air temperature varies widely even if the altitude is the same, the critical altitude is usually determined based on the highest air temperature (i.e., the hot day condition) in order to protect the turbocharger even in the worst conditions.

Therefore, when the actual air temperature is lower than that in the hot day conditions, the critical altitude is set at a value lower than the altitude actually required for protecting the turbocharger. This means that, the maximum engine output power is unnecessarily restricted to a value lower than the rated output power in an altitude range above the critical altitude when the condition is other than the hot day condition. The undue restriction in the maximum output power of the engine sometimes deteriorates the operating performance of the aircraft.

This problem may be solved by changing the critical altitude in accordance with the actual temperature conditions. (the air temperature). However, if the critical altitude must be changed in accordance with the temperature conditions, the line representing the maximum limit for the fuel injection amount in FIG. 2 must be changed in accordance with the air temperature. This complicates the fuel injection amount control system of the aircraft engine and, therefore, is not preferable.

SUMMARY OF THE INVENTION

In view of the problems as set forth above, an object of the present invention is to provide means for controlling the fuel injection amount of the engine in accordance with the flight altitude, and the air temperature, in such a manner that the maximum engine output power is not unnecessarily restricted in conditions other than the hot day conditions while keeping the turbocharger speed at less than the maximum allowable speed.

The object as set forth above is achieved by a fuel supply control device for a turbo-charged diesel aircraft engine, according to the present invention, comprising, an altitude sensor that detects the flight altitude of the aircraft, an ambient temperature sensor that detects the ambient air temperature of the aircraft and a fuel supply amount reduction means for reducing the amount of fuel to the engine from a value determined by the engine output power requirement in accordance with the ambient air temperature when the flight altitude is higher than a predetermined altitude.

Further, according to the present invention, there is provided a method for controlling the fuel supply to a turbo-charged diesel aircraft engine comprising a step for detecting the flight altitude of the air craft, a step for detecting the ambient air temperature of the aircraft and a step for reducing the amount of fuel supplied to the engine from a value, which is determined by the engine output power requirement, in accordance with the ambient air temperature when the flight altitude is higher than a predetermined altitude.

According to the present invention, the amount of fuel supplied to the engine is reduced in accordance with the air temperature when the flight altitude is higher than a predetermined altitude. Therefore, even if the critical altitude is determined based on, for example, the standard conditions, the fuel supply amount is reduced when the air temperature becomes higher. Thus, a turbocharger overrun in hot day conditions can be prevented. Further, as the critical speed can be determined based on the standard conditions, an undue restriction on the engine maximum output power does not occur.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the control system for a turbo-charged diesel aircraft engine according to the present invention will be explained with reference to FIGS. 1 through 10.

Figure 1:
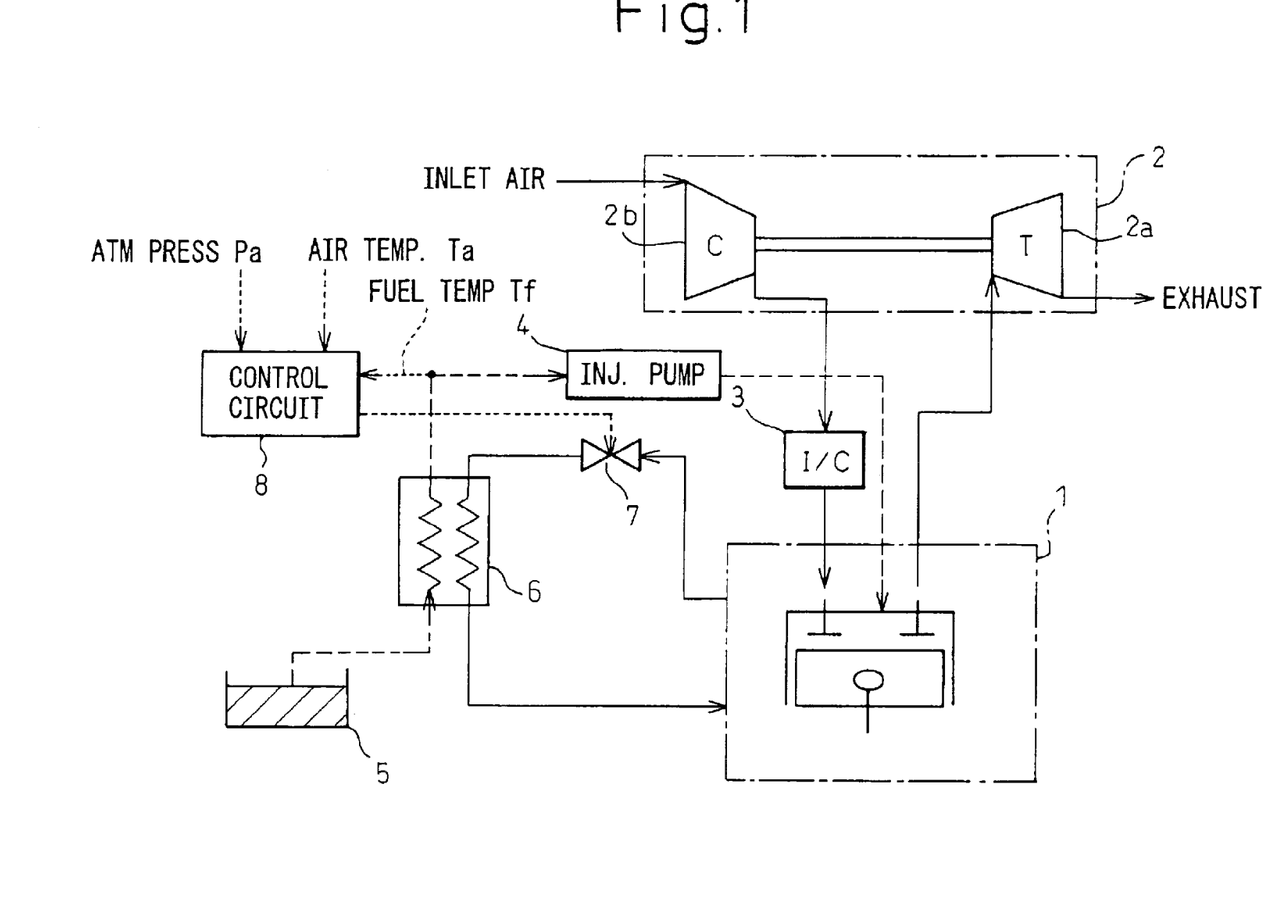
FIG. 1 schematically illustrates a general configuration of an embodiment of the present invention.

FIG. 1 schematically illustrates an embodiment of a fuel supply control-device for a turbo-charged diesel aircraft engine according to the present invention. In FIG. 1, numeral 1 designates an internal combustion engine for driving a propeller (not shown) of an aircraft. In this embodiment, the engine 1 is a multiple-cylinder type turbo-charged diesel engine equipped with a turbocharger 2.

The turbocharger 2 includes an exhaust gas turbine 2a driven by exhaust gas from the engine 1 and a compressor 2b driven by the turbine 2a. Intake air of the engine 1 is pressurized by the compressor 2b and supplied to the engine 1 as boost air. Numeral 3 in FIG. 1 is an intercooler for cooling the boost air before it is supplied to the engine.

Numeral 5 in FIG. 1 is a fuel tank for storing fuel for the engine 1. Fuel in the fuel tank 5 is supplied to a fuel injection pump 4 through a fuel heater 6 and fuel pressurized by the fuel injection pump 4 is supplied to fuel injection valves disposed on the respective cylinders of the engine 1.

The fuel injection pump 4 is a distributor type fuel injection pump that pressurizes fuel by a single plunger and distributes the pressurized fuel to the respective cylinders. As a distributor type fuel injection pump is well known in the art, a detailed explanation thereof is not given here.

A fuel heater 6 is disposed on the fuel line between the fuel tank 5 and the fuel injection pump 4.

An anti-freezing fuel heater, which is usually required by aviation regulation in order to prevent water contained in fuel from freezing by keeping the fuel temperature above the freezing point (0° C.), is used for the fuel heater 6 in this embodiment.

In this embodiment, the fuel heater 6 is a heat exchanger of known type (such as a shell and tube type or a plate type heat exchanger) that utilizes the lubricating oil of the engine 1 as a heating medium. Numeral 7 in FIG. 1 represents a temperature control valve that controls the temperature of fuel at the outlet of the heater 6. The temperature control valve 7 is, for example, constructed as a solenoid operated shut-off valve that opens and closes in accordance with the control signal supplied from a control circuit 8. Namely, the control valve 7 is opened by the control circuit 8 in order to circulate hot lubricating oil from the engine 1 to the heat exchanger 6 when the fuel temperature is lower than a predetermined target value and closed when the fuel temperature is higher than the target value.

In this embodiment, a target fuel injection amount of the engine 1 is determined based on the position of a throttle lever (not shown), i.e., the engine output power required by the pilot of the aircraft. In this embodiment, however, any known method for determining the target fuel injection amount can be used.

Further, as explained before, the amount of fuel injected into the engine is restricted by the maximum fuel injection amount curve as shown in FIG. 2 in accordance with the flight altitude. In other words, if the target fuel injection amount, determined by the boost pressure and the throttle lever position, is larger than the maximum fuel injection amount determined by the curve in FIG. 2, the actual fuel injection amount is set at the maximum fuel injection amount.

As explained before when the flight altitude exceeds the critical altitude, the maximum fuel injection amount starts to decrease, from the amount corresponding to the rated output power of the engine, as the altitude becomes higher.

However, the critical altitude varies depending on the air temperature. For example, FIG. 4 shows the relationship between the turbocharger speed and altitude when the air temperature changes.

Figure 4:
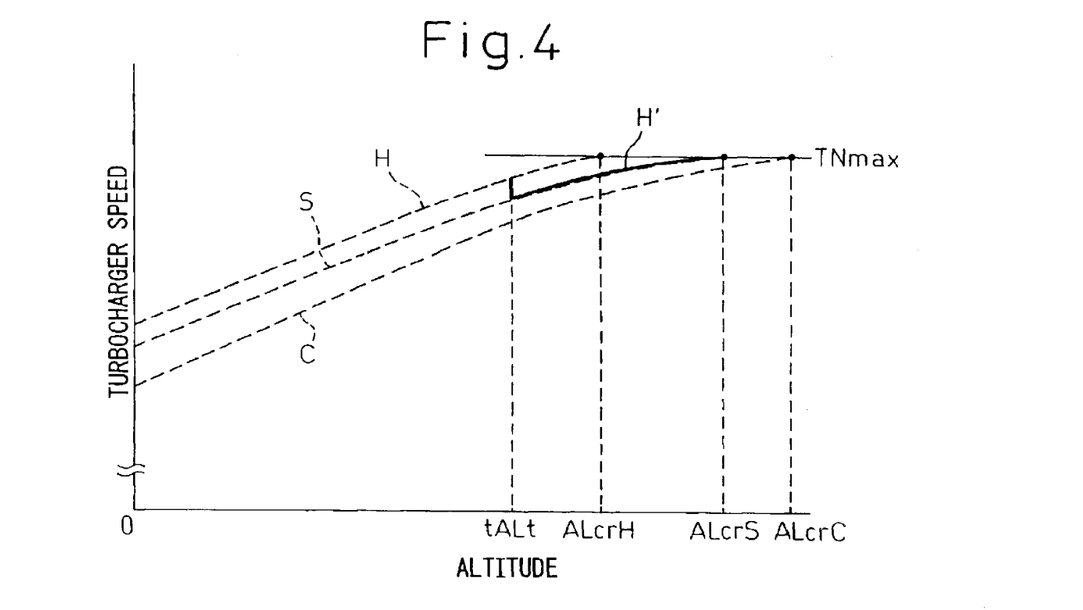
FIG. 4 is a drawing explaining the relationship between the turbocharger speed and altitude when the air temperature changes.

In FIG. 4, the vertical axis and the horizontal axis represent the turbocharger speed and the altitude, respectively. The curves H, S and C represent turbocharger speeds when the engine produces the rated output power in the hot day conditions, standard conditions and cold conditions, respectively.

Further, TNmax in FIG. 4 indicates the maximum allowable turbocharger speed determined by the design of the turbocharger.

The broken line H in FIG. 4 indicates the change in the turbocharger speed in the hot day conditions. As shown in FIG. 4, the turbocharger speed increases as the altitude becomes higher and, in hot day conditions, i.e., when the air temperature is high, the turbocharger speed reaches the maximum limit TNmax at an altitude ALcrH. In other words, the critical altitude is ALcrH in the hot day conditions. In FIG. 4, the solid line S and the broken line C represent the change in the turbocharger speed in the standard conditions and the cold day conditions, respectively. As can be seen from FIG. 4, the critical altitude in the standard conditions and the cold conditions are ALcrS and ALcrC, respectively.

Since ALcrH<ALcrS<ALcrC, the critical altitude is usually determined based on the hot day conditions considering the worst case and ALcrH is used for the critical speed regardless of the air temperature. Thus, the problem as explained before, i.e., that the maximum output power of the engine is unnecessarily restricted in the conditions other than the hot day conditions, occurs. For example, when the aircraft is operating in a standard conditions, the engine is not allowed to operate at its rated output power at the altitude higher than ALcrH even though the engine can actually operate at the rated output power up to the altitude ALcrS in the standard conditions.

In order to solve this problem, the critical altitude in this embodiment is determined based on the conditions other than the hot day conditions, for example, on the standard conditions.

Therefore, as the critical altitude is set at ALcrS, the problem of undue restriction of the maximum engine output power does not occur in the standard conditions. However, in this case, the turbocharger overrun is likely to occur in the hot day conditions when the flight altitude is between ALcrH and ALcrS.

In order to prevent the turbocharger overrun in the hot day conditions, the maximum fuel injection amount is restricted in the hot day conditions in such a manner that the turbocharger speed changes in accordance with the solid line H' in FIG. 4 when the flight altitude is higher than a predetermined value. By controlling the turbocharger speed as shown in FIG. 4, the turbocharger overrun does not occur in the hot day conditions at the altitude above ALcrH.

In this embodiment, the restriction of the maximum fuel injection amount is performed by reducing the fuel injection amount by increasing the fuel temperature.

As explained before, the distributor type fuel injection pump is used for fuel injection pump 4 in this embodiment. When the distributor type fuel injection pump is used, the fuel injection amount is adjusted by controlling the effective stroke of the plunger. The discharge amount of the displacement type pump is subject to an influence of the changes in the density and the bulk modulus of fuel due to the change in the temperature of fuel.

Figure 5:
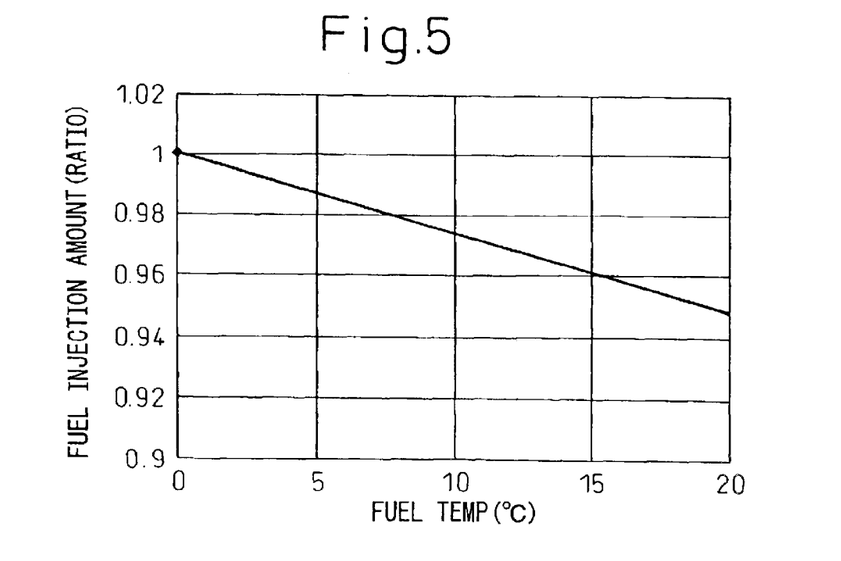
FIG. 5 is a drawing showing an example of the relationship between the change in the fuel injection amount and the change in the temperature of fuel when a distributor type fuel injection pump is used.

FIG. 5 shows an example of the change in the fuel injection amount due to the change in the temperature of fuel when a distributor type fuel injection pump is used. The horizontal axis in FIG. 5 represents the fuel temperature Tf and the vertical axis thereof represents the fuel injection amount when the effective plunger stroke is kept constant. The numerals on the vertical axis represent the ratio of the fuel injection amount to the fuel injection amount at fuel temperature 273° K. It can be seen, from FIG. 5, that the actual fuel injection amount changes largely in accordance with fuel temperature even though the effective plunger stroke is the same.

Figure 6:
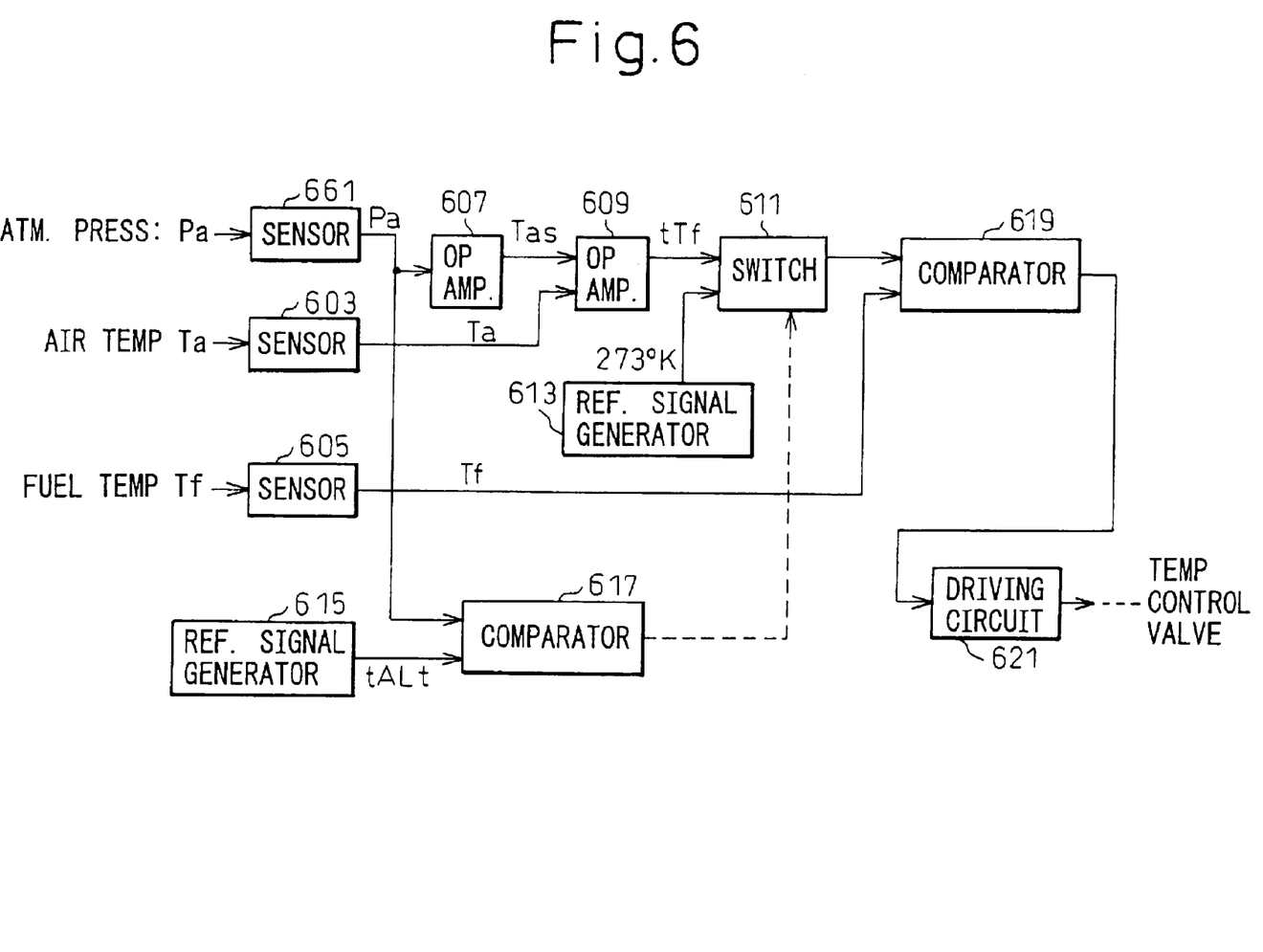
FIG. 6 is an example of a block diagram of the control circuit in FIG. 1.

FIG. 6 is a block diagram of the control circuit 8 in FIG. 1 showing the fuel supply control of the present embodiment.

In FIG. 6, numeral 601 represents an atmospheric pressure sensor that detects the actual atmospheric pressure Pa. 603 represents an ambient temperature sensor that detects the actual air temperature Ta. Numeral 605 is a fuel temperature sensor that detects the fuel temperature Tf at the outlet of the heat exchanger 6.

The output of the atmospheric pressure sensor 601 is fed to an operational amplifier 607. Further, the output of the operational amplifier 607 and the output Ta of the ambient temperature sensor are fed to another operational amplifier 609.

Figure 7:
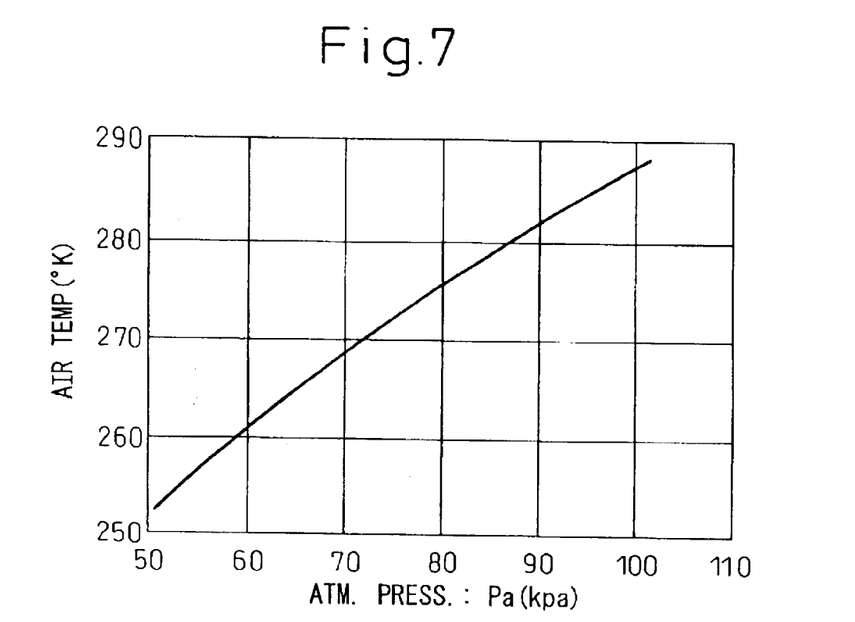
FIG. 7 shows the relationship between the air temperature Tas and the atmospheric pressure Pa.

The operational amplifier 607 outputs a signal corresponding to the air temperature Tas at the present altitude in the standard conditions based on the atmospheric pressure Pa detected by the atmospheric pressure sensor 601 using the relationship between the air temperature Tas and the atmospheric pressure Pa in FIG. 7. The relationship in FIG. 7 is obtained from the relationship between the atmospheric pressure Pa and the altitude ALt in FIG. 8 and the relationship between the altitude and the air temperature as shown by the line S in FIG. 3.

Figure 9:
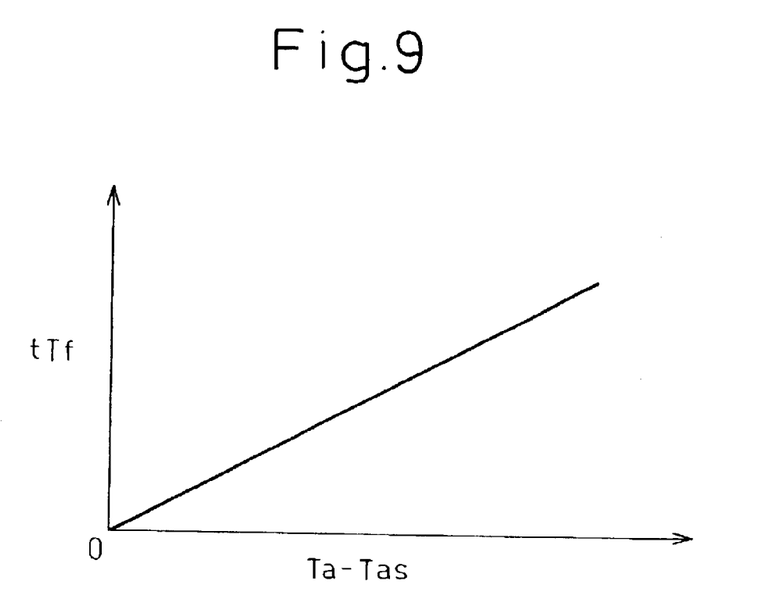
FIG. 9 shows the relationship between the target temperature of fuel and air temperature.

The output Tas (the air temperature in standard conditions) is then fed to the operational amplifier 609 together with the actual air temperature Ta detected by the ambient temperature sensor 603. The operational amplifier 609 calculates the difference Ta−Tas between the actual air temperature Ta and the air temperature in the standard conditions Tas. Further, the operational amplifier 609 outputs a signal corresponding to a target fuel temperature tTf based on the calculated difference Ta−Tas using the relationship between the tTf and Ta−Tas as shown in FIG. 9.

The target fuel temp tTf is a fuel temperature required for obtaining the fuel injection amount corresponding to the turbocharger speed represented by the solid line H' in FIG. 4. As can be seen from FIG. 9, as the difference Ta−Tas is larger, the target fuel temperature tTf is becomes larger. In other words, the restriction of the maximum fuel injection amount become larger (i.e., the maximum fuel injection amount becomes smaller when other conditions are the same) as the actual air temperature Ta becomes higher.

The output tTf of the operational amplifier 609 is supplied to a switch 611.

The fuel temperature control using the target fuel temperature tTf is performed only when the flight altitude is higher than a predetermined altitude represented by tALt in FIG. 4. For this purpose, the atmospheric pressure Pa is supplied to a comparator 617 and compared with a reference signal from a reference signal generator 615. The reference signal supplied to the comparator 617 corresponds to the altitude tALt (for example, about 8,000 feet).

Figure 8:
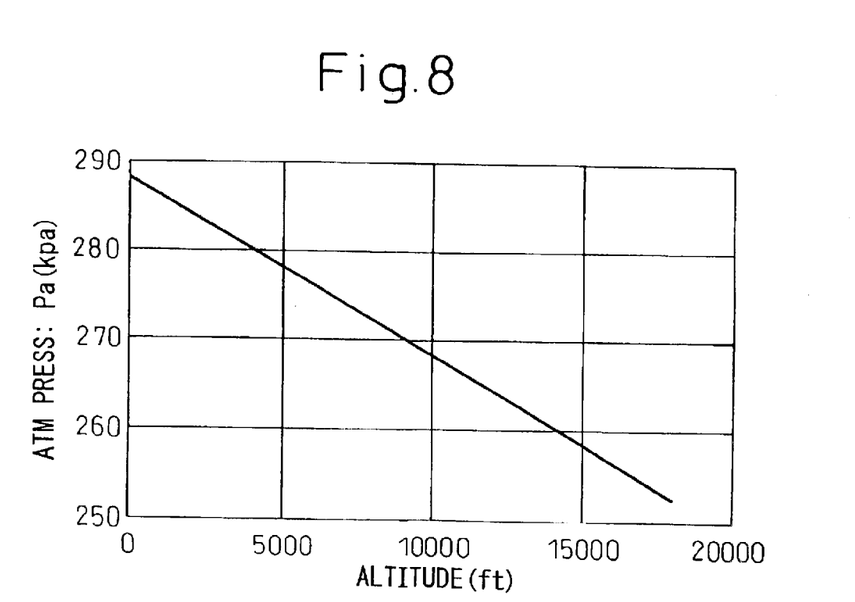
FIG. 8 shows the relationship between the atmospheric pressure Pa and the altitude Alt.

The comparator 617 compares the actual altitude ALt obtained from atmospheric pressure Pa using the relationship in FIG. 8 and the altitude tALt corresponding to the reference signal and, if the present altitude is higher than the reference altitude tALt (i.e., if ALt>tALt), transmits a switching signal to a switch 611.

The switch 611 outputs the target fuel temperature signal tTf supplied from the operational amplifier 609 when the switching signal from the comparator 617 is received. Another reference signal generator 613 that generates a reference temperature signal Tf0 corresponding to 273° K temperature is provided and the output thereof is supplied to the switch 611. When the switching signal from the comparator 617 is not received, the switch 611 outputs the reference temperature signal Tf0.

The output of the switch 611 is supplied to a comparator 619 and compared with the actual fuel temperature Tf detected by the fuel temperature sensor 605.

When the actual fuel temperature Tf is lower than the output of the switch 611, the comparator outputs an activation signal to a driving circuit 621 of the temperature control valve 7 (FIG. 1) in order to open the valve 7. Therefore, in this case, the hot lubricating oil from the engine 1 is introduced into the heat exchanger 6, whereby the fuel is heated. When the actual temperature Tf becomes higher than the output of switch 611, the activation signal from the comparator 619 stops and the temperature control valve closes. Therefore, the supply of the hot lubricating oil to the heat exchanger 6 is stopped. Thus, the fuel temperature at the outlet of the heat exchanger 6 is controlled to the temperature corresponding to the output signal of the switch 611.

As explained above, according to the fuel temperature control performed by the controller 8 in FIG. 6, the comparator 617 does not transmit the switching signal to the switch 611 when the altitude is lower than the reference altitude tALt (FIG. 4) and, in this case, the comparator 619 transmits an activation signal to the temperature control valve 7 only when the fuel temperature becomes lower than 0° C. Thus, freezing of the water contained in fuel does not occur at an altitude range lower than the reference altitude.

When the flight altitude becomes higher than the reference altitude tALt, the switching signal is transmitted to the switch 611 and the signal corresponding the target fuel temperature tTf is fed to the comparator 619. Therefore, the temperature control valve 7 is controlled so that the temperature of fuel is controlled to the target fuel temperature tTf determined in accordance with the air temperature Ta based on the relationship in FIG. 9. Thus, the fuel injection amount is controlled in such a manner that the turbocharger speed changes according to the altitude as indicated by the curve H' in FIG. 4.

Figure 10:
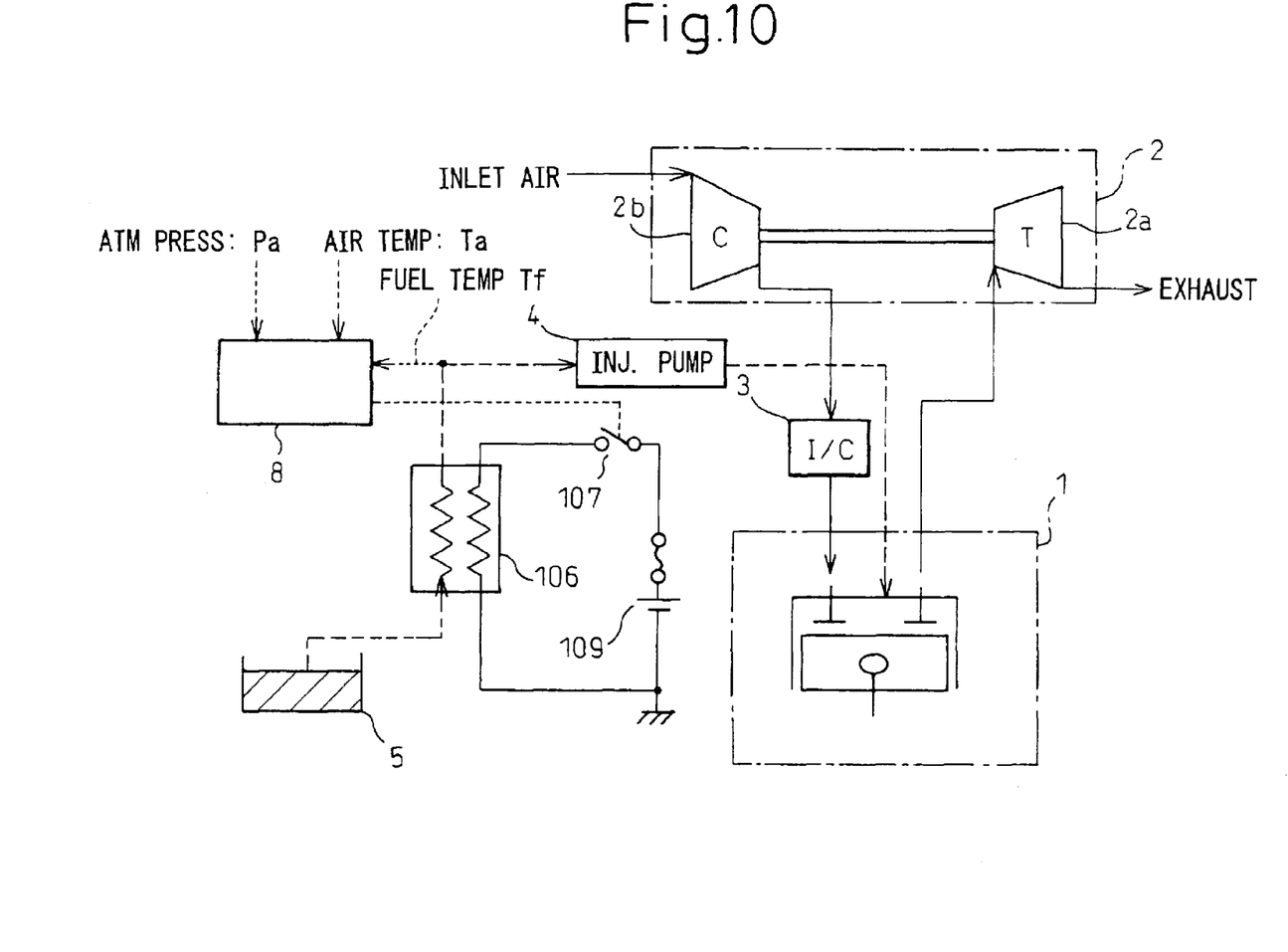
FIG. 10 schematically illustrates a general configuration of another embodiment of the present invention.

FIG. 10 is a drawing similar to FIG. 1 showing the general construction of another embodiment of the fuel supply control device according to the present invention.

In FIG. 10, reference numerals the same as those in FIG. 1 represent similar elements.

The embodiment in FIG. 10 is different from the previous embodiment in that an electric heater 106, instead of a heater utilizing lubricating oil as a heating medium, is used for the fuel heater.

In FIG. 10, the electric fuel heater 106 is connected to a battery 109 via a relay 107. The relay 107 connects and disconnects the heater 106 to and from the battery 109 in accordance with the signal supplied from the control circuit 8. The control circuit connects and disconnects the relay 107 in the manner same as opening and closing the temperature control valve 7 in the previous embodiment in order to control the fuel temperature at the target value tTf. Thus, in this embodiment, by using the electric fuel heater 107, it is possible to perform a fuel temperature control the same as in the previous embodiment.

According to the embodiments in FIGS. 1 and 10, the fuel temperature control can be performed using the anti-freezing fuel heater 6 (or 106), which is required by the aviation regulations. Therefore, the fuel temperature control in these embodiments can be done without a significant increase in the manufacturing cost of an aircraft.

What is claimed is:

1. A fuel supply control device for a turbo-charged diesel aircraft engine comprising:
   an altitude sensor that detects the flight altitude of the aircraft;
   an ambient temperature sensor that detects the ambient air temperature of the aircraft;
   a fuel supply amount reduction means for reducing the amount of fuel to the engine from a value determined by the engine output power requirement in accordance with the ambient air temperature when the flight altitude is higher than a predetermined altitude.

2. A fuel supply control device as set forth in claim 1, wherein the fuel supply amount reduction means reduces the amount of fuel in accordance with the ambient temperature by adjusting the temperature of fuel supplied to the engine.

3. A fuel supply control device as set forth in claim 2, wherein the fuel supply amount reduction means adjusts the temperature of fuel supplied to the engine using an anti-freezing fuel heater.

4. A method for controlling a fuel supply to a turbo-charged diesel aircraft engine comprising:
   a step for detecting the flight altitude of the aircraft;
   a step for detecting the ambient air temperature of the aircraft; and
   a step for reducing the amount of fuel supplied to the engine from a value, which is determined by the engine output power requirement, in accordance with the ambient air temperature when the flight altitude is higher than a predetermined altitude.

5. A method as set forth in claim 4, wherein the step for reducing the amount of fuel supplied to the engine further comprises a step for reducing the amount of fuel in accordance with the ambient temperature by adjusting the temperature of the fuel supplied to the engine.

6. A method as set forth in claim 5, wherein the step for reducing the amount of fuel in accordance with the ambient temperature further comprises a step for adjusting the temperature of fuel supplied to the engine using an anti-freezing fuel heater.

* * * * *